(No Model.)
R. G. WOODWARD.
CAR BRAKE.
No. 569,311.  Patented Oct. 13, 1896.
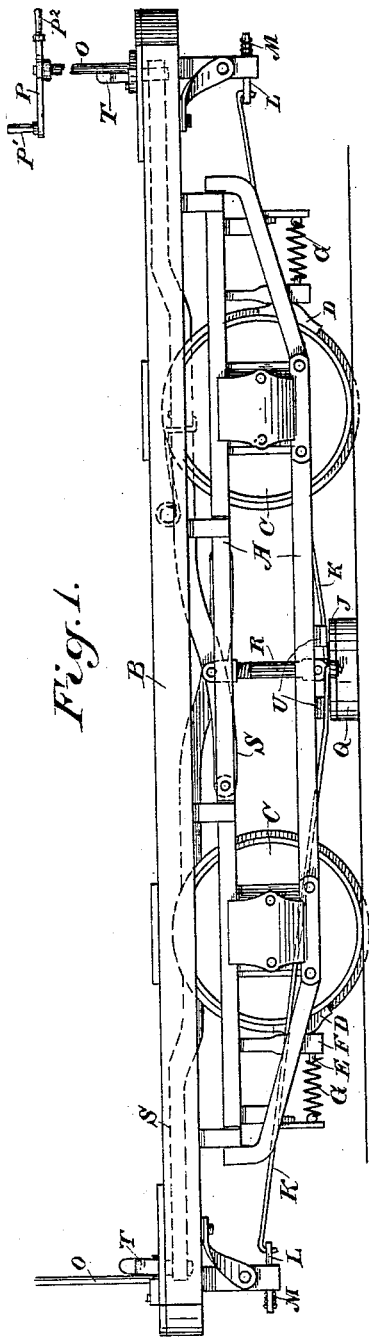
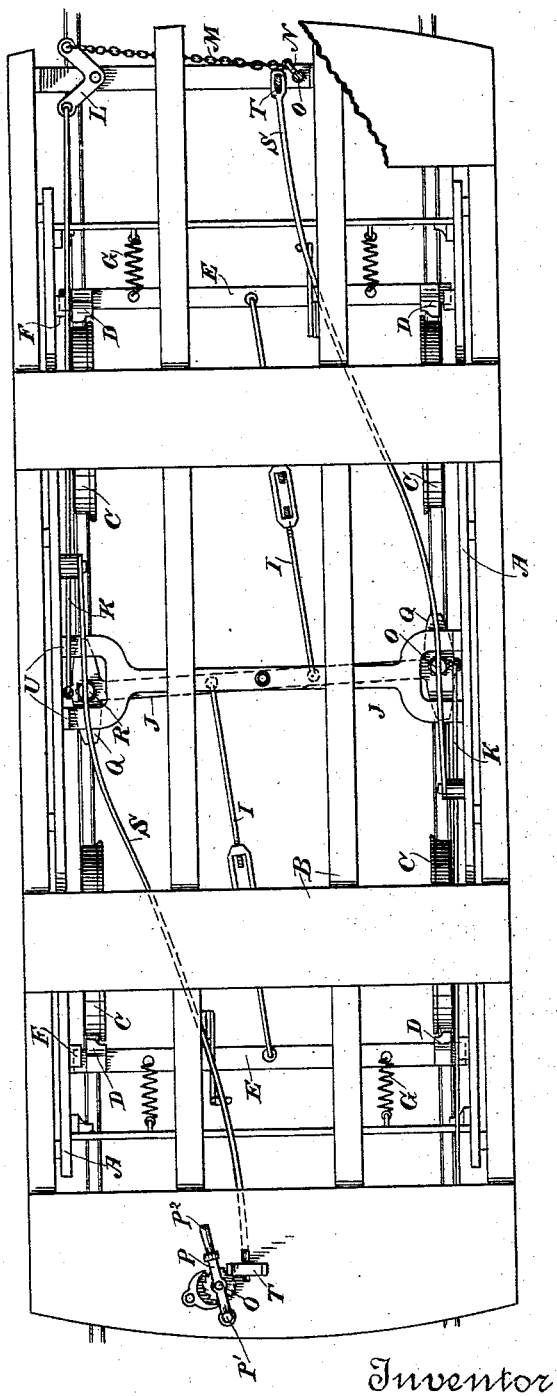

UNITED STATES PATENT OFFICE.

ROBERT G. WOODWARD, OF ALAMEDA, CALIFORNIA.

CAR-BRAKE.

SPECIFICATION forming part of Letters Patent No. 569,311, dated October 13, 1896.

Application filed February 11, 1896. Serial No. 578,927. (No model.)

*To all whom it may concern:*

Be it known that I, ROBERT G. WOODWARD, a citizen of the United States, residing at Alameda, county of Alameda, State of California, have invented an Improvement in Car-Brakes; and I hereby declare the following to be a full, clear, and exact description of the same.

My invention relates to improvements in car-brakes, and is especially adapted for use upon street-railway cars of all descriptions.

It consists, essentially, in the combination of wheel and track brakes so connected as to act simultaneously.

It consists also in details of construction which will be more fully explained by reference to the accompanying drawings.

Figure 1 is a side elevation of a car-truck and its connections with my brake mechanism attached to it. Fig. 2 is a plan view of the same.

A is the truck-frame, upon which the superstructure B of the car is supported.

C C are the bearing-wheels, the axles of which are journaled in suitable boxes in the usual manner.

D D are brake-shoes fixed upon transverse bars E, so as to be applied to the peripheries of the wheels. The ends of the bars E are movable horizontally in guides F, and springs G act to normally draw the bars and brake-shoes back and away from the wheels. From the center of each bar a connecting-rod I extends to the centrally-pivoted lever J, one of these rods being connected with the lever at one side of the center and the other at the opposite side, so that when this lever is turned about its fulcrum in one direction it will draw the brake-bars toward itself and thus apply the brakes to the wheel. When turned in the opposite direction, it releases the brakes. From the outer ends of this lever-arm rods K extend, one to each end of the car, and these rods are connected with the extreme end of the lever, so as to pass outside of the wheels, thus giving the greatest amount of power that it is possible to obtain with a given length of lever within the limits of the truck-frame. The ends of these rods are connected each with one arm of a bell-crank lever L, the angle of which is fulcrumed upon a suitable yoke or frame which is secured to the car body or truck. A rope or chain M connects the opposite arms of these levers with an arm or stud N, which projects from the vertical rotary brake shaft or drum O. This shaft is properly journaled and extends up through the floor at the end of the car, having upon the upper end a device by which it may be turned so as to exert a tension upon the rope or chain, and thus through the bell-crank lever apply the brakes as previously described.

The object of the projecting stud is to form an attachment for the end of the rope or chain at such a distance from the drum-shaft that a partial revolution of this shaft will take up all the slack and bring the brake-shoes to a point where a slight further movement will apply them to the wheels.

The amount of movement of the brake shaft or drum is practically about a half-revolution only, thus making it possible to apply the brake almost instantly.

As a convenient means for turning the brake-shaft I have shown a transverse lever P fixed to the top, projecting to each side of the shaft. One end of this lever is upturned, so as to form a crank and handle P', while the other has a horizontal handle P² formed upon it. This upturned handle is in such position as to be grasped by the operator, and the part of a turn necessary to take up the slack is easily made with one hand, after which the other hand may grasp the opposite end of the lever, and the whole power of the operator be applied to turn the brake-shaft. By thus constructing the handle with one upturned end which normally projects toward the operator it can be easily worked without the interference from the other end on account of it being in a horizontal position.

It will be seen that either of the brake-shafts at the opposite end of the car will produce the same result in applying the brakes, one operating upon one end of the central fulcrumed lever J and the other upon the opposite end. This central lever is made elastic in a vertical direction, being preferably made of thin flat steel of sufficient width to give it the necessary strength in the direction upon which the strain is brought upon it, but with elasticity enough to allow of a vertical motion. It will be manifest that the same result will be obtained by using a rigid lever and allowing it to tilt vertically about its fulcrum or pivot-pin. Connected with the lower sides of the ends of this lever are shoes Q, which normally stand in line above the rails upon which the wheels travel. When these shoes are forced down upon the track, they serve as a track-brake. They are operated in the following manner: From the upper sides of the shoes rods R extend upwardly and are connected with levers S. One of these levers is situated upon each side of the car, and one end is fulcrumed near to the connection of the rod R. The other end of the lever extends to a point just beneath the platform where the operator stands, and by means of a foot-rod T pressure can be brought upon this lever to force it down, thus acting through the rod R to depress the central pivoted lever and force this shoe into contact with the track. A suitably-arranged spring will raise this central lever, together with the track-shoe, whenever the pressure upon the foot-piece is removed.

The connection between the central fulcrumed lever J and the lever S is a jointed one, so that the central fulcrumed lever is allowed to turn about its fulcrum without interfering with its connection with the foot-lever.

Stops U serve to limit the movement of the lever J in each direction. One of the foot-levers acts upon one end of this lever J, and the other upon the opposite end.

Whenever the foot-lever is depressed so as to force the track-brake down upon the track, the friction thus produced tends to move the brake backward and thus turn the pivoted lever J about its fulcrum. This will immediately apply the wheel-brakes by reason of their connection with this lever J. It will thus be seen that whenever the track-brake is applied by pressure of the foot the wheel-brakes will also be instantly applied without further operation by means of the hand-brake, or the hand-brake may be applied independently of the track-brake by means previously described.

In order to adjust the track-brake to compensate for wear, the rods connecting it with the foot-lever are made with adjusting-screws, so that they can be lengthened or shortened to suit.

It will be manifest that the positions of the various parts of the foot-lever and track-brake actuating mechanism may be changed to suit circumstances, but the operation will be essentially as herein described.

Having thus described my invention, what I claim as new, and desire to secure by Letters Patent, is—

1. A track-brake comprising a horizontally-disposed centrally-pivoted lever whose ends are capable of vertical movement, a shoe or shoes carried by the ends of said lever, means for depressing the shoes to form a frictional contact with the track, wheel-brakes and connections between them and the track-brake lever whereby the movement of the latter acts to apply the wheel-brakes.

2. In a car-brake, a centrally-pivoted lever capable of vertical movement, track-brakes carried by the ends of said lever, mechanism by which the lever may be depressed so as to depress one of the track-brakes and cause a frictional contact between the shoe and the track, wheel-brakes adapted to form contact with the wheels, brake-bars upon which they are carried and rods connecting the brake-bars with the track-brake-carrying lever, whereby the turning of said lever about its fulcrum, will force the wheel-brake shoes into contact with the wheels.

3. The combination of track-brakes carried upon a vertically-movable and centrally-pivoted lever, with wheel-brake and rods connecting the brake-bars with said central lever whereby the depression of one end of the lever will cause a frictional contact between the track-brake and the track, and a resulting movement of the lever about its fulcrum to simultaneously apply the wheel-brakes.

4. In a car-brake, a centrally-pivoted lever having track-brakes upon its opposite ends, a foot-lever and connections between it and the brake-carrying lever whereby either end of the latter may be depressed to form frictional contact with the track, wheel-brakes mounted upon laterally-moving brake-bars, rods connecting said brake-bars with the centrally-pivoted lever whereby the wheel-brakes may be automatically applied by the action of the track-brake, and other rods connecting the outer ends of the track-brake lever with bell-crank levers fulcrumed at opposite ends of the cars, a vertical brake-shaft with means for rotating it, and a rope or chain connecting the bell-crank lever therewith, whereby the wheel-brakes may be independently applied by hand.

5. Wheel-brakes mounted upon laterally-moving brake-bars, a centrally-pivoted lever with which said brake-bars are connected at opposite sides of its fulcrum, rods connecting with the outer ends of said lever and extending to opposite ends of the car exterior to the wheels, horizontally-disposed bell-crank levers fulcrumed at the angle with one end of each of which one of the rods connects, a chain or rope connecting with the opposite end of the bell-crank lever, a vertical brake shaft or drum having a stud or arm projecting therefrom with which the end of the chain is connected so that a partial rotation of the brake-shaft acts through the stud to take up the slack of the rope or chain and bring the brakes into contact with the wheel.

In witness whereof I have hereunto set my hand.

ROBERT G. WOODWARD.

Witnesses:
T. F. SCANLON,
GEO. F. YOUNG.